UNITED STATES PATENT OFFICE.

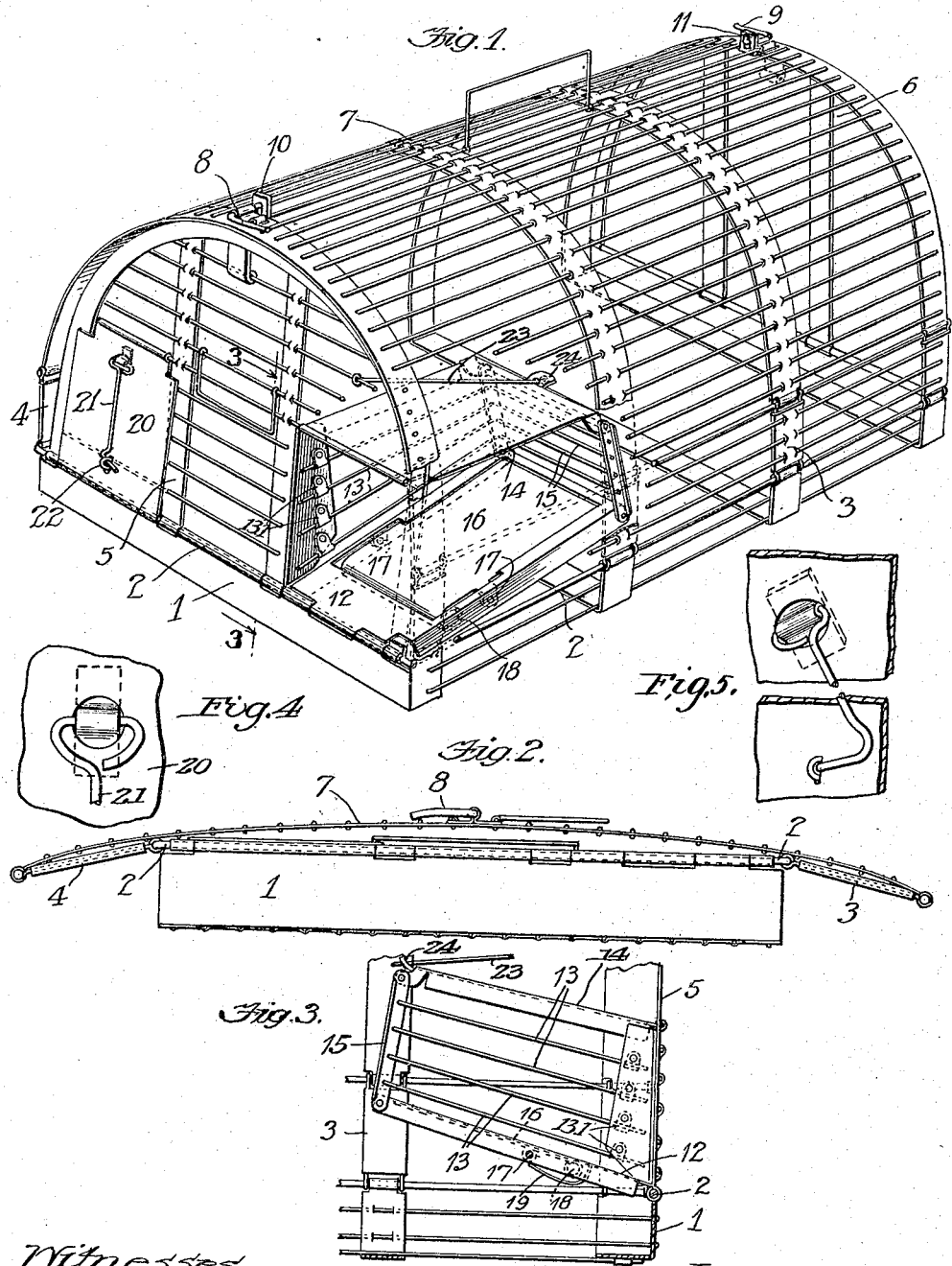

FREDERICK BENOIT, OF CHICAGO, ILLINOIS.

ANIMAL-TRAP.

1,218,589.  Specification of Letters Patent.  Patented Mar. 6, 1917.

Application filed May 1, 1916. Serial No. 94,701.

*To all whom it may concern:*

Be it known that I, FREDERICK BENOIT, a citizen of the United States of America, and a resident of Chicago, county of Cook, and State of Illinois, have invented certain new and useful Improvements in Animal-Traps, of which the following is a specification.

The main objects of this invention are to provide an improved form of animal trap; to provide an improved type of construction whereby the trap can be readily folded into compact form for storage or shipment, and whereby it can be made inexpensively from scraps and miscellaneous cuttings of sheet metal.

An illustrative embodiment of this invention is shown in the accompanying drawings, in which:

Figure 1 is a perspective view of the trap with a portion of one side broken away to more clearly show the arrangement and structure of the entrance-way.

Fig. 2 is an end elevation showing the trap in folded position.

Fig. 3 is a longitudinal vertical section of the entrance-way.

Fig. 4 is an enlarged detail of the swivel joint between locking hook and door plate.

Fig. 5 is an enlarged detail in perspective of the locking hook and its swivel.

In the construction shown in the drawings, the base 1 of the trap is shaped to resemble a shallow rectangular tray and comprises sheet metal end pieces 1, flanged at their bottom and side edges and connected to each other by spaced parallel wires which form the bottom and upstanding fixed sides of the base. The rim or upper edge of the base is surrounded by a stiffening wire 2 of somewhat larger gage. This may to advantage be made up of two U-shaped halves, having their ends held in the rolled upper edges of the flanges of said end pieces. The side wall members 3 and 4 and end wall members 5 and 6 are hinged to this wire at the sides and ends respectively of the base.

The end wall members 5 and 6 are arranged to be folded inwardly on the base 1 and the side wall members 3 and 4 are arranged to fold outwardly, as shown in Fig. 2. A top member 7 of substantially the same width as the base 1 and sides 3 and 4 combined, is hinged at its opposite edges to the sides 3 and 4. The top 7 is formed of spaced wires held by transversely disposed strips of flexible sheet metal, and the sides 3 and 4 are also of this construction, but the sides need not necessarily be flexible.

Means for connecting the ends 5 and 6 to the top are provided and comprise a pair of latches 8 and 9 mounted at opposite ends of the middle of the top and in position to engage upstanding lugs 10 and 11 respectively on the ends 5 and 6.

The entrance way comprises a bottom 12, side 13, top 14 and end 15, hinged together at their points of intersection, and it is located adjacent to one side of the trap, so that the wall of the trap on such side serves also as the side of the entrance way. When the end 5 is folded inward, the entrance way is adapted to fold or collapse, and the outer ends of the bars which form the side 13 are slidably mounted on pivoted lugs 13.1 so as to allow such folding.

A trap-door 16 is located at the bottom of the entrance way and is pivoted intermediate its ends at 17 so as to rock in a vertical plane. A counter-weight 18 is provided on the outer end of the door for normally holding it in a closed position, and a shield 19 is located under and protects the counter-weight so that an animal in the trap cannot lift upward thereon in such manner as to open the door and allow other animals in the trap to escape.

Means for unfolding the entrance way and for holding it in a raised position spaced above the floor of the base 1 are provided and comprise a rod 23 having one end secured to the end 5 and the other end engaging the lug 24 on the top 14. The end engaging the lug has sliding connection therewith so as to allow folding of the top 14 and end 5 in compact form.

The animals caught in the trap may be released at a door 20 hinged at its upper edge to the end 5 and normally held closed by a latch 21 mounted to swing and turn on a swivel near the top of the door and in position to engage a loop 22 which extends through a slot located near the bottom of the door. The swivel allows the latch to be rotated at its base, and when the swivel is turned one half revolution from the position in which it is shown in Fig. 1, the end of the hook will be turned in the opposite direction and may then enter the loop 22 from the other side thereof as shown in Fig. 5. The loop 22 is preferably formed in a cross wire as shown and extends through a vertical slot in the door. Thus the cross wire serves as a spring urging the loop downward to keep a tension on the hook and avoid accidental loosening thereof. The mounting of the latch 21 as shown also permits a person to raise the door when unfastened, by means of the latch 21, without bringing the fingers near the exit, where they might be bitten by the animals.

The operation of the device is believed to be apparent from the foregoing description. The construction shown is particularly advantageous for the purposes of storing the trap when not in use and for packing the trap for shipment. The top is flexible and is of substantially the same width as the base and sides combined, and when the ends are folded inward, the sides may be folded outward and the top collapse down on to the base in compact form as shown in Fig. 2. When the trap is to be set up, all that is necessary is to slightly raise the top 7 and then pull the ends 5 and 6 into upright position. The ends, being under the top, raise it into the position shown in Fig. 1 and it may then be locked in this position by the latches 8 and 9.

Although but one specific embodiment of this invention is herein shown and described, it will be understood that the construction may be altered and details omitted without departing from the spirit of this invention as defined by the following claims.

I claim:

1. An animal trap comprising a base, ends hinged to said base, sides hinged to said base, a top hinged to said sides, said top and sides being shaped and arranged to fold into compact form on said base and a collapsible entrance way in one of said ends and foldable therewith.

2. An animal trap comprising a base, ends hinged to said base, sides hinged to said base, a top hinged to said sides, said top and sides being shaped and arranged to fold into compact form on said base, and a substantially rectangular entrance way having a top, bottom, inner end and one side, said entrance way being located adjacent one of the sides of said trap so that the side of said trap serves as the other side of said entrance way.

3. An animal trap comprising a base, ends hinged to said base, sides hinged to said base, a top hinged to said sides, said top and sides being shaped and arranged to fold into compact form on said base, a substantially rectangular entrance way having a top, bottom, inner end and one side, said entrance way being located adjacent one of the sides of said trap so that the side of said trap serves as the other side of said entrance way, a pivoted door at the bottom of said entrance way, and a counter-weight for normally holding said door in closed position.

4. An animal trap comprising a base, ends hinged to said base, sides hinged to said base, a top hinged to said sides, said top and sides being shaped and arranged to fold into compact form on said base, a substantially rectangular entrance way having a top, bottom, inner end and one side, said entrance way being located adjacent one of the sides of said trap so that the side of said trap serves as the other side of said entrance way, a door pivoted intermediate its ends at the bottom of said entrance way, a counter-weight on one end of said door for normally holding it in a closed position, and a shield underneath said counterweight for preventing animals in said trap from lifting upward thereon and opening said door.

5. An animal trap comprising a base, side wall members hinged to said base, a flexible top hinged to said side members, end wall members hinged to said base and foldable inwardly thereon, an entrance way mounted on one of said end members, said entrance way being collapsible and foldable inwardly together with said end member, and a connection between said end member and entrance way for unfolding said entrance way when said end member is raised to its unfolded position.

6. An animal trap having a substantially rectangular entrance way comprising a top, bottom, inner end and one side wall, said side wall being formed of a plurality of spaced bars, said bars being slidably mounted at one end so as to permit said side wall to collapse in its own plane.

7. In an animal trap, a base, a wall hinged thereto and having an entrance, an entrance-way having its top and bottom hinged at the top and bottom of said entrance and having an end hinged to said top and bottom whereby said entrance-way will collapse when said wall is folded down upon said base, and means connecting said end wall and entrance-way and adapted to set up said entrance-way when said wall is lifted.

8. In an animal trap, a base, a wall hinged thereto and having an entrance, an entrance-way having its top and bottom hinged at the top and bottom of said entrance and having an end hinged to said top and bottom whereby said entrance-way will collapse when said wall is folded down upon said base, and means connecting said end wall and entrance-way and adapted to set up said entrance-way when said wall is lifted, said entrance-way having a collapsible side wall.

9. In an animal trap, a base, a wall hinged thereto and having an entrance, an entrance-way having its top and bottom hinged at the top and bottom of said entrance and having an end hinged to said top and bottom whereby said entrance-way will collapse when said wall is folded down upon said base, and means connecting said end wall and entrance-way and adapted to set up said entrance-way when said wall is lifted, said entrance-way having a collapsible side wall comprising a series of wires pivoted at their ends.

Signed at Chicago this 26th day of April, 1916.

FREDERICK BENOIT.

Copies of this patent may be obtained for five cents each, by addressing the "Commissioner of Patents, Washington, D. C."